United States Patent
Chen

(10) Patent No.: US 11,112,657 B2
(45) Date of Patent: Sep. 7, 2021

(54) LIQUID CRYSTAL DISPLAY DEVICE

(71) Applicant: TCL CHINA STAR OPTOELECTRONICS TECHNOLOGY CO., LTD., Shenzhen (CN)

(72) Inventor: Xingwu Chen, Shenzhen (CN)

(*) Notice: Subject to any disclaimer, the term of this patent is extended or adjusted under 35 U.S.C. 154(b) by 44 days.

(21) Appl. No.: 16/626,336

(22) PCT Filed: Nov. 13, 2019

(86) PCT No.: PCT/CN2019/118029
§ 371 (c)(1),
(2) Date: Dec. 24, 2019

(87) PCT Pub. No.: WO2021/072868
PCT Pub. Date: Apr. 22, 2021

(65) Prior Publication Data
US 2021/0165288 A1  Jun. 3, 2021

(30) Foreign Application Priority Data
Oct. 16, 2019 (CN) .......................... 201910981676.6

(51) Int. Cl.
*G02F 1/1343* (2006.01)
*G02F 1/1335* (2006.01)

(52) U.S. Cl.
CPC .. *G02F 1/134309* (2013.01); *G02F 1/133528* (2013.01)

(58) Field of Classification Search
CPC ......... G02F 1/133528; G02F 1/134309; G02F 1/13718; G02F 1/1334; G02F 1/13756; C09K 19/0275; C09K 19/00; G09G 2300/0486; G09G 2300/0495
See application file for complete search history.

(56) References Cited

U.S. PATENT DOCUMENTS

| | | | |
|---|---|---|---|
| 6,072,558 A | 6/2000 | Tanaka et al. | |
| 2007/0229739 A1 | 10/2007 | Iwamoto | |
| 2010/0157213 A1* | 6/2010 | Kubo | G02F 1/134309 349/114 |
| 2013/0141675 A1 | 6/2013 | Hsieh et al. | |
| 2013/0250216 A1* | 9/2013 | Chen | G02F 1/133707 349/96 |

FOREIGN PATENT DOCUMENTS

| CN | 101046584 A | 10/2007 |
|---|---|---|
| CN | 101881903 A | 11/2010 |
| CN | 103135273 A | 6/2013 |
| CN | 103135275 A | 6/2013 |
| CN | 103323984 A | 9/2013 |

* cited by examiner

*Primary Examiner* — Mariam Qureshi

(57) ABSTRACT

A liquid crystal display device includes a first substrate having a first electrode, a second substrate having a second electrode, a liquid crystal layer, a first polarizer, and a second polarizer. A chiral agent is added in a liquid crystal filled in the liquid crystal layer, a pitch of the liquid crystal is about 8-60 μm; an effective optical path difference of the liquid crystal is about 300-550 nm. By adding a chiral agent to the liquid crystal, changing the angle between the stem electrode and the branch electrode or the angle between the polarization axis of the polarizer and the stem electrode, the transmittance is maximized, thereby achieving high transmittance display.

5 Claims, 4 Drawing Sheets

LIQUID CRYSTAL DISPLAY DEVICE

FIELD OF INVENTION

The present disclosure relates to a field of display technologies, and in particular to a liquid crystal display device.

BACKGROUND OF INVENTION

Currently used liquid crystal displays are classified into twisted nematic (TN) mode, vertical alignment (VA) mode, in-plane switching (IPS) mode, and fringe field switching (FFS) mode, etc. The most commonly used technology in the VA display mode is polymer stabilized vertical alignment (PSVA), which has the advantages of high contrast and fast response. PSVA liquid crystal display technology has become the most extensive display technology at present. However, people have higher and higher requirements for display technology. Wider viewing angles and higher transmittance have always been important directions for the future development of display technology.

The PSVA display mode needs to add a UV process in the cell process, that is, ultraviolet (UV) irradiation is performed under power-on conditions. So, after the liquid crystal molecules are inclined towards a certain direction, the polymerizable monomers in the liquid crystal are polymerized by ultraviolet irradiation, thereof forming a certain pretilt angle. However, in the existing pixel structure, a peripheral area of the pixel display in the PSVA display mode may have a non-ideal condition, resulting in a dark area.

SUMMARY OF INVENTION

The present disclosure provides a liquid crystal display device to solve the display technical problem of the conventional liquid crystal display device, since the PSVA display mode is adopted, a dark area is generated around the pixel, which affects a transmittance of the product, thereby affecting the display.

Directed against the above problems, the technical solutions provided by the present disclosure are as follows:

The present disclosure provides a liquid crystal display device including a first substrate having a first electrode, a second substrate having a second electrode, a liquid crystal layer sandwiched between the first substrate and the second substrate, a first polarizer, and a second polarizer, the second substrate is opposite to the first substrate, the first polarizer is arranged on a side of the first substrate away from the liquid crystal layer, the second polarizer is arranged on a side of the second substrate away from the liquid crystal layer; therein, a chiral agent is added in a liquid crystal filled in the liquid crystal layer, a pitch of the liquid crystal is about 8-60 μm, an effective optical path difference of the liquid crystal is about 300-550 nm; a thickness of the liquid crystal layer is about 2.5-4 μm; the first electrode includes at least one stem electrode and a plurality of branch electrodes, the stem electrode defines a plurality of zones, the branch electrodes in different zones extend from the stem electrode along different directions, the branch electrodes in the same zone are arranged in parallel.

In at least one embodiment of the present disclosure, an angle between the branch electrode in each of the zones and the stem electrode is the same and is 45 degrees.

In at least one embodiment of the present disclosure, an angle between a polarization axis of the second polarizer and the stem electrode is θ, when the pitch of the liquid crystal is about 8-11, the θ is about 40-60 degrees; when the pitch of the liquid crystal is about 11-13.5 μm, the θ is about 35-55 degrees; when the pitch of the liquid crystal is about 13.5-16 μm, the θ is about 25-45 degrees; when the pitch of the liquid crystal is about 16-18.5 μm, the θ is about 20-40 degrees; when the pitch of the liquid crystal is about 18.5-60 μm, the θ is about 15-35 degrees.

In at least one embodiment of the present disclosure, an extending direction of the stem electrode coincides with the polarization axis of the second polarizer.

In at least one embodiment of the present disclosure, the stem electrode divides the plurality of branch electrodes into a first zone, a second zone adjacent to the first zone, a third zone diagonally opposite to the first zone, and a fourth zone diagonally opposite to the second zone.

In at least one embodiment of the present disclosure, an angle between the branch electrode in the first zone and the stem electrode is the same with an angle between the branch electrode in the third zone and the stem electrode; an angle between the branch electrode in the second zone and the stem electrode is the same with an angle between the branch electrode in the fourth zone and the stem electrode.

In at least one embodiment of the present disclosure, the angle between the branch electrode in the first zone and the stem electrode is $\Phi_1$, the angle between the branch electrode in the second zone and the stem electrode is $\Phi_2$; when the pitch of the liquid crystal is about 8-13.5 μm, the $\Phi_1$ is about 0-15 degrees, the $\Phi_2$ is about 75-90 degrees; when the pitch of the liquid crystal is about 13.5-16 μm, the $\Phi_1$ is about 0-20 degrees, the $\Phi_2$ is about 70-90 degrees; when the pitch of the liquid crystal is about 16-18.5 μm, the $\Phi_1$ is about 5-25 degrees, the $\Phi_2$ is about 65-90 degrees; when the pitch of the liquid crystal is about 18.5-60 μm, the $\Phi_1$ is about 10-30 degrees, the $\Phi_2$ is about 60-90 degrees.

In at least one embodiment of the present disclosure, the pitch of the liquid crystal is about 2-10 times the thickness of the liquid crystal layer.

The present disclosure further provides a liquid crystal display device including a first substrate having a first electrode, a second substrate having a second electrode, a liquid crystal layer sandwiched between the first substrate and the second substrate, a first polarizer, and a second polarizer, the second substrate is opposite to the first substrate, the first polarizer is arranged on a side of the first substrate away from the liquid crystal layer, the second polarizer arranged on a side of the second substrate away from the liquid crystal layer, therein, a chiral agent is added in a liquid crystal filled in the liquid crystal layer, a pitch of the liquid crystal is about 8-60 μm; an effective optical path difference of the liquid crystal is about 300-550 nm.

In at least one embodiment of the present disclosure, the first electrode includes at least one stem electrode and a plurality of branch electrodes, the stem electrode defines a plurality of zones, and the branch electrodes in different zones extend from the stem electrode along different directions, and the branch electrodes in the same zone are arranged in parallel.

In at least one embodiment of the present disclosure, an angle between the branch electrode in each of the zones and the stem electrode is the same and is 45 degrees.

In at least one embodiment of the present disclosure, an angle between a polarization axis of the second polarizer and the stem electrode is θ; when the pitch of the liquid crystal is about 8-11 μm, the θ is about 40-60 degrees; when the pitch of the liquid crystal is about 11-13.5 μm, the θ is about 35-55 degrees; when the pitch of the liquid crystal is about 13.5-16 μm, the θ is about 25-45 degrees; when the pitch of the liquid crystal is about 16-18.5 µm, the θ is about 20-40 degrees; when the pitch of the liquid crystal is about 18.5-60 µm, the θ is about 15-35 degrees.

In at least one embodiment of the present disclosure, an extending direction of the stem electrode coincides with the polarization axis of the second polarizer.

In at least one embodiment of the present disclosure, the stem electrode divides the plurality of branch electrodes into a first zone, a second zone adjacent to the first zone, a third zone diagonally opposite to the first zone, and a fourth zone diagonally opposite to the second zone.

In at least one embodiment of the present disclosure, an angle between the branch electrode in the first zone and the stem electrode is the same with an angle between the branch electrode in the third zone and the stem electrode; an angle between the branch electrode in the second zone and the stem electrode is the same with an angle between the branch electrode in the fourth zone and the stem electrode.

In at least one embodiment of the present disclosure, the angle between the branch electrode in the first zone and the stem electrode is $\Phi_1$, the angle between the branch electrode in the second zone and the stem electrode is $\Phi_2$; when the pitch of the liquid crystal is about 8-13.5 µm, the $\Phi_1$ is about 0-15 degrees, the $\Phi_2$ is about 75-90 degrees; when the pitch of the liquid crystal is about 13.5-16 µm, the $\Phi_1$ is about 0-20 degrees, the $\Phi_2$ is about 70-90 degrees; when the pitch of the liquid crystal is about 16-18.5 µm, the $\Phi_1$ is about 5-25 degrees, the $\Phi_2$ is about 65-90 degrees; when the pitch of the liquid crystal is about 18.5-60 µm, the $\Phi_1$ is about 10-30 degrees, the $\Phi_2$ is about 60-90 degrees.

In at least one embodiment of the present disclosure, a thickness of the liquid crystal layer is about 2.5-4 µm.

In at least one embodiment of the present disclosure, the pitch of the liquid crystal is about 2-10 times the thickness of the liquid crystal layer.

The beneficial effects of the present disclosure: by adding a chiral agent to the liquid crystal, the liquid crystal molecules around the pixel is driven by a helical twisting force generated by the chiral agent to rotate, thereby reducing the dark area around the pixel, by additionally changing the angle between the stem electrode and the branch electrode or the angle between the polarization axis of the polarizer and the stem electrode, the transmittance of the liquid crystal display device is maximized, thereby achieving higher transmittance display.

DESCRIPTION OF DRAWINGS

In order to more clearly illustrate the technical solutions in the embodiments or the prior art, the drawings to be used in the descriptions of the embodiments or the prior art will be briefly described below. Obviously, the drawings in the following description are merely embodiments of the present disclosure. For those of ordinary skill in the art, without any creative work, other drawings may be obtained from the drawings.

DETAILED DESCRIPTION OF EMBODIMENTS

Figure 1:
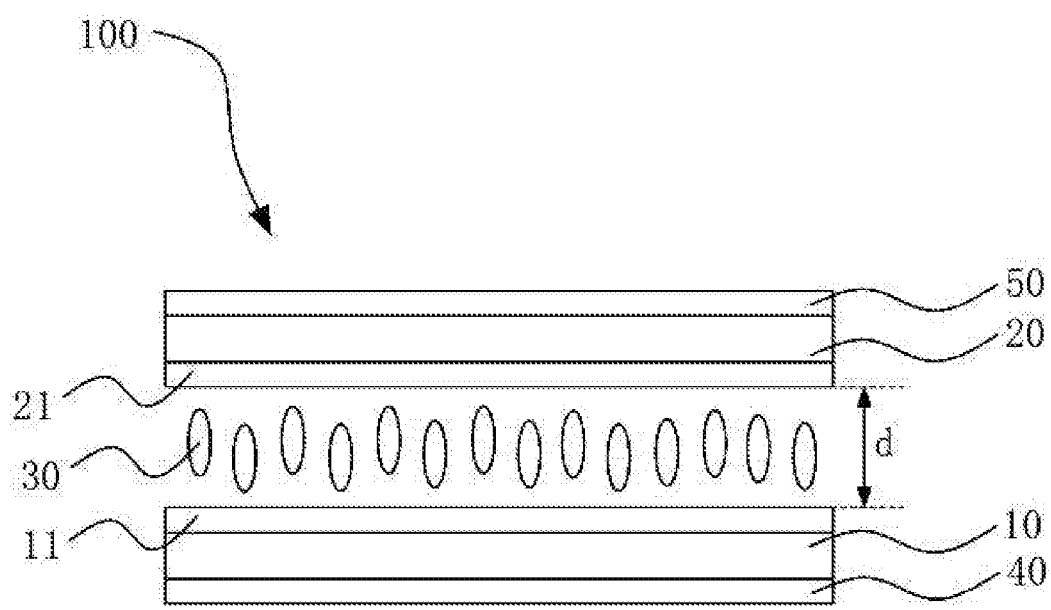
FIG. 1 is a schematic structural view of a liquid crystal display device of an embodiment according to the present disclosure.

The following descriptions of the various embodiments are upon the attached figures, and are provided to illustrate the specific embodiments of the present disclosure that can be implemented. Directional terms mentioned in the present disclosure, such as "upper", "lower", "front", "rear", "left", "right", "inside", "outside", "lateral", etc., refer to the directions of the attached figures. Therefore, the directional terms are used for the purpose of illustration and understanding of the present disclosure, rather than limiting the present disclosure. In the figures, structurally similar elements are labeled by the same reference numerals.

The present disclosure is directed to the display technical problem of the conventional liquid crystal display device, since the PSVA display mode is adopted, a dark area is generated around the pixel, which affects a transmittance of the product, thereby affecting the display. This embodiment can offset the defect.

As shown in FIG. 1, a liquid crystal display device 100 according to an embodiment of the present disclosure includes a first substrate 10, a second substrate 20, a liquid crystal layer 30, a first polarizer 40, and a second polarizer 50.

The first substrate 10 and the second substrate 20 are opposite to each other. The liquid crystal layer 30 is sandwiched between the first substrate 10 and the second substrate 20. The first polarizer 40 is arranged on a side of the first substrate 10 away from the liquid crystal layer 30. The second polarizer 50 is arranged on a side of the second substrate 20 away from the liquid crystal layer 30.

Therein, the first substrate 10 has a first electrode 11. The first electrode 11 is arranged on a side of the first substrate 10 adjacent to the liquid crystal layer 30. The second substrate 10 has a second electrode 21. The second electrode 21 is arranged on a side of the second substrate 20 adjacent to the liquid crystal layer 30. The liquid crystal layer 30 is used for filling a liquid crystal, and the liquid crystal is filled between the first electrode 11 and the second electrode 21.

The PSVA liquid crystal display needs to add a UV process in the cell process. After the liquid crystal molecules are inclined towards a certain direction, polymerizable monomers in the liquid crystal are polymerized by ultraviolet light irradiation, thereof forming a certain pretilt angle. However, in the existing pixel structure, a peripheral area of the pixel display in the PSVA display mode may have a non-ideal condition, resulting in a dark area. The embodiments of the present disclosure improve this by adding the chiral agent to cause periodicity rotation of the liquid crystal molecules. The helical twisting force generated by the chiral agent drives the liquid crystal molecules around the pixel to rotate, thereby effectively reducing the width of the peripheral dark area, and thereby increasing the transmittance of the liquid crystal display device 100.

A pitch (P) of the liquid crystal doped with the chiral agent is about 8-60 µm. The liquid crystal molecules periodically rotate, after 360 degrees of rotation and returned to the original orientation, a layer spacing is defined as the pitch P of the liquid crystal.

The liquid crystal is a negative liquid crystal. The transmittance per unit area is improved by maintaining the effective optical path difference $\Delta$nd of the liquid crystal between 300 nm and 550 nm. $\Delta$n is a liquid crystal birefringence coefficient, d is a thickness of the liquid crystal layer 30 (the gap between the first electrode 11 and the second electrode 21). The thickness d of the liquid crystal layer 30 is about 2.5-4 μm. Specifically, the pitch P of the liquid crystal is about 2-10 times the thickness of the liquid crystal layer 30.

Figure 2:
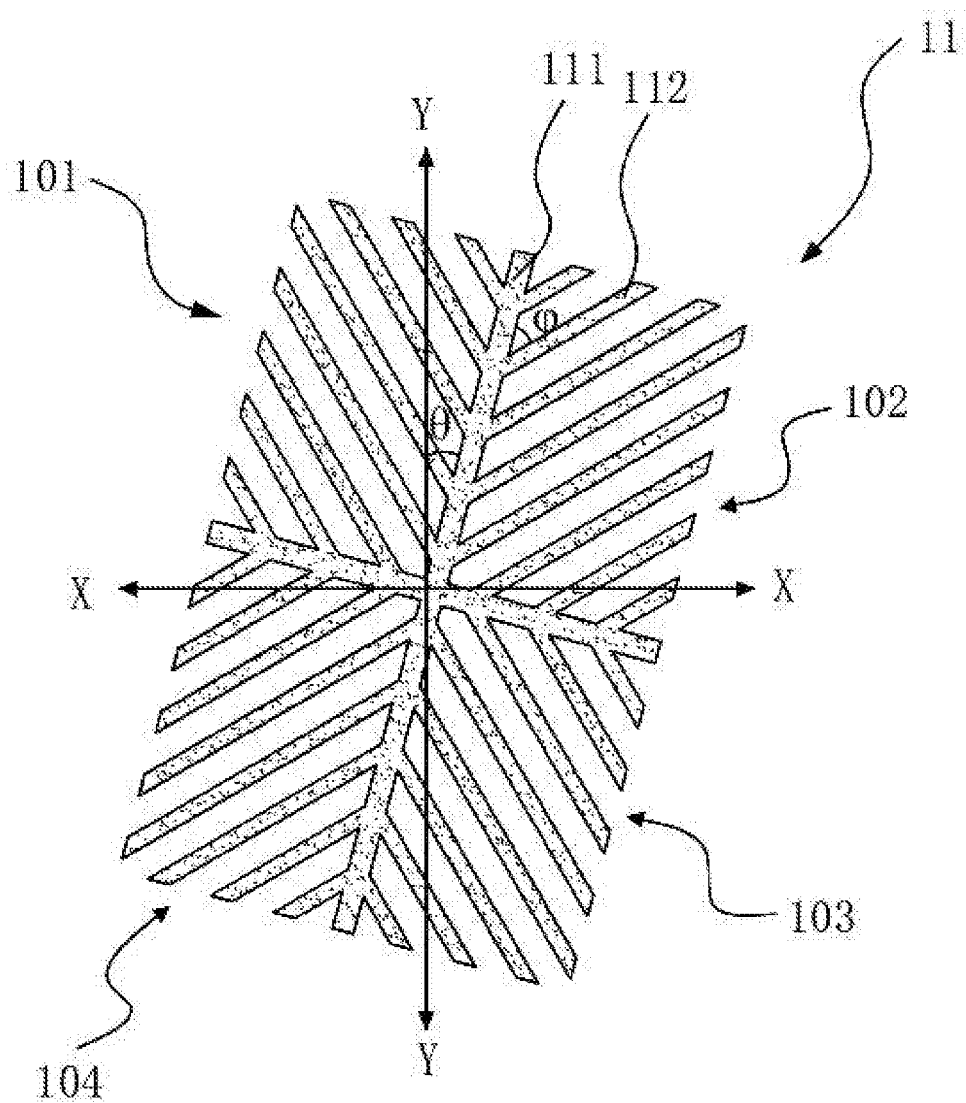
FIG. 2 is a schematic structural view of a second electrode of an embodiment according to the present disclosure.

As shown in FIG. 2, the first electrode 11 includes at least one stem electrode 111 and a plurality of branch electrodes 112. The stem electrode 111 defines a plurality of zones. The branch electrodes 112 in different zones extend from the stem electrode 111 along different directions. The branch electrodes 112 in the same zone are arranged in parallel, that the extension directions are the same.

Specifically, in the embodiment, the first electrode 11 includes two intersecting and perpendicular stem electrodes 111 forming a cross structure. The two stem electrodes 111 divide the plurality of branch electrodes 112 into four zones, which defined as a first zone 101, a second zone 102 adjacent to the first zone 101, a third zone 103 diagonally opposite to the first zone 101, and a fourth zone 104 diagonally opposite to the second zone 102.

Depending on adding the chiral agent to the liquid crystal molecules, the transmittance can be maximized by changing the angle between the electrodes of the liquid crystal display device 100 or the angle between the electrode and the polarizer axis of the polarizer, and by matching different liquid crystal materials.

A polarization axis X of the first polarizer 40 and a polarization axis Y of the second polarizer 50 are particular to each other. A massive structure of the first electrode 11 is rectangle or square. When an angle Φ between the stem electrode 111 of the first electrode 11 in each of the zones and the stem electrode 111 is kept the same and is 45 degrees, an angle between polarization axis Y of the second polarizer 50 and the stem electrode 111 is θ. For different liquid crystal materials, the transmittance of the liquid crystal display varies with the angle θ, but the transmittance can be maximized within a certain range of the angles. The stem electrodes 111 involved in the respective above-mentioned angles are the angles formed by the same stem electrode.

When the angle Φ is 45 degrees, depending on the maximum transmittance, an angle relationship between the pitch p of the liquid crystal material and the polarization axis Y of the second polarizer is as shown in Table 1 below.

TABLE 1

| P (μm) | θ(°) |
|---|---|
| 8 ≤ P ≤ 11 | 40 ≤ θ ≤ 60 |
| 11 ≤ P ≤ 13.5 | 35 ≤ θ ≤ 55 |
| 13.5 ≤ P ≤ 16 | 25 ≤ θ ≤ 45 |
| 16 ≤ P ≤ 18.5 | 20 ≤ θ ≤ 40 |
| 18.5 ≤ P ≤ 60 | 15 ≤ θ ≤ 35 |

Figure 3:
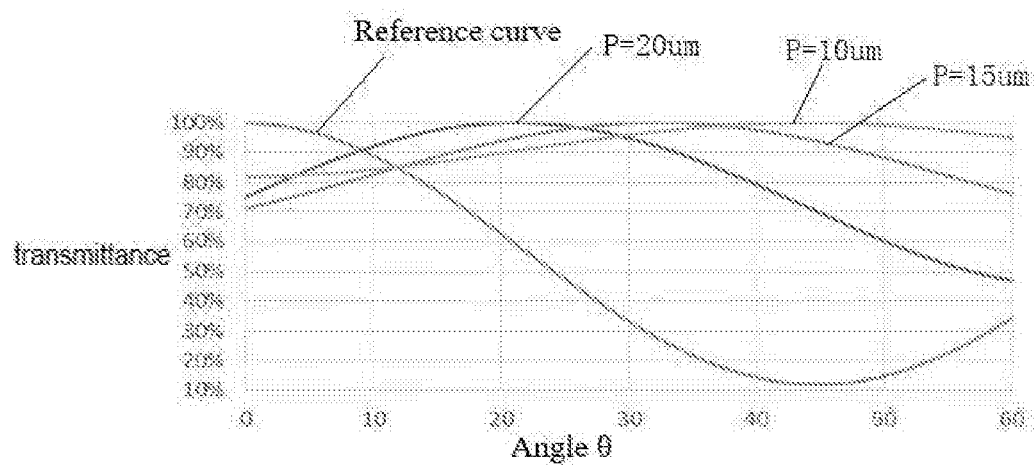
FIG. 3 is a graph view showing a transmittance of a liquid crystal display device of an embodiment according to the present disclosure.

As shown in FIG. 3, the abscissa is a value of the angle θ between the stem electrode 111 and the polarization axis Y of the second polarizer 50, and the ordinate is the transmittance of the liquid crystal display device. The curves in FIG. 3 are a reference curve and curves of the transmittance as a function of the angle θ in the case of P=20 μm, P=15 μm, and P=10 μm, respectively. By adjusting the value of P of the liquid crystal material and the relationship between the stem electrode and the polarization axis of the second polarizer, the width of the dark area between the pixels can be effectively reduced, the effective aperture ratio is increased, and then the transmittance is improved.

In other embodiments, the transmittance can be maximized by keeping the stem electrode and the polarization axis of the second polarizer coincident (angle θ is zero), and by adjusting the angle Φ between the branch electrode in different zones and the stem electrode.

Figure 4:
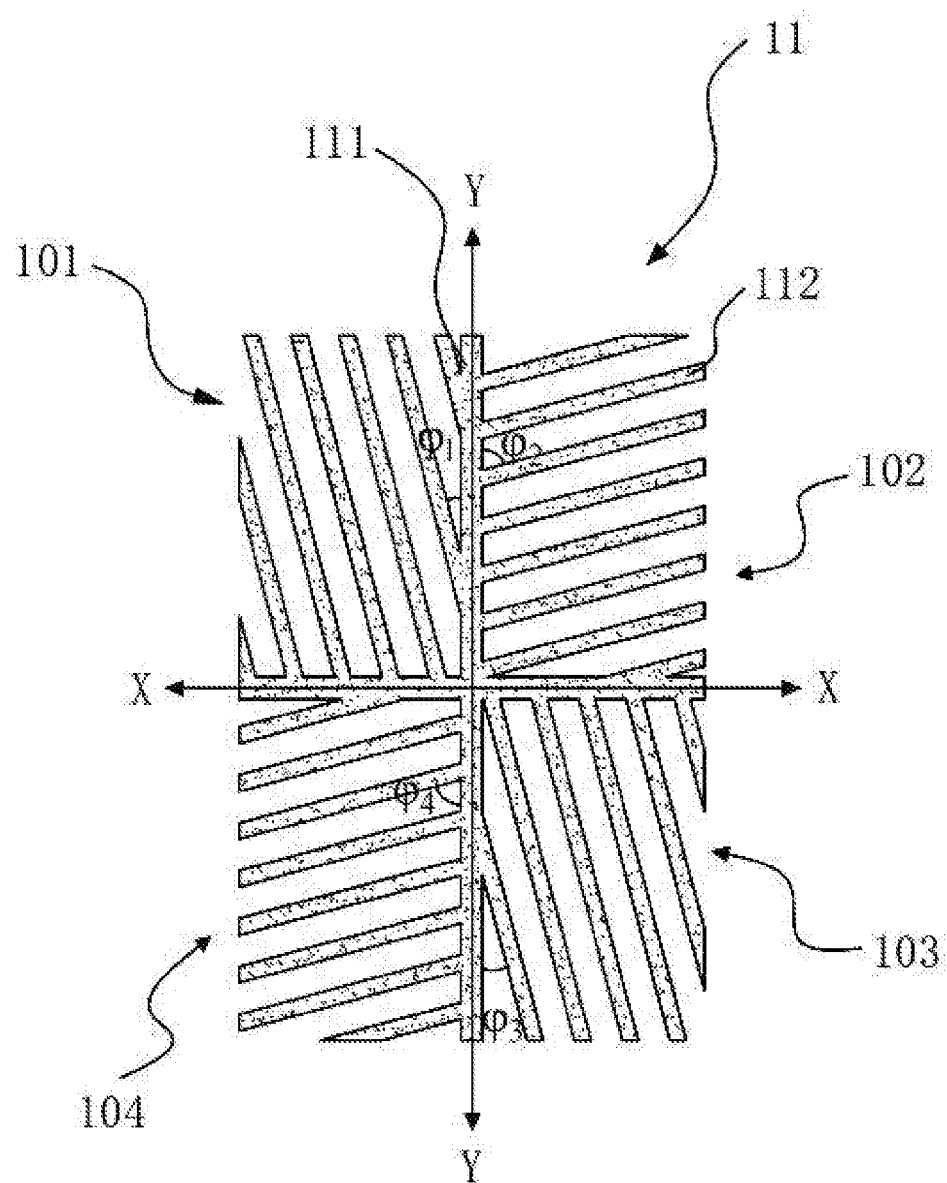
FIG. 4 is a schematic structural view of the second electrode of other embodiments according to the present disclosure.

As shown in FIG. 4, among the two stem electrodes 111 of the cross structure, one of the stem electrodes 111 extends along a direction coincident with the polarization axis Y of the second polarizer 50, and the other one of the stem electrodes 111 extends along a direction coincident with the polarization axis X of the first polarizer 40.

When the stem electrode 111 is coincident with the polarization axis Y, an angle between the branch electrode 112 in the first zone 101 and the steam electrode 111 is $\Phi_1$, an angle between the branch electrode 112 in the second zone 102 and the steam electrode 111 is $\Phi_2$, an angle between the branch electrode in the third zone 103 and the steam electrode is $\Phi_3$, an angle between the branch electrode in the fourth zone 104 and the steam electrode is $\Phi_4$, $\Phi_1$ and $\Phi_3$ are the same, $\Phi_2$ and $\Phi_4$ are the same.

When the angle θ is zero, depending on the maximum transmittance, the relationships between the pitch p of the liquid crystal material and the angle Φ in each of the zones are as shown in Table 2 below.

TABLE 2

| P (μm) | $\Phi_1$ (°) | $\Phi_2$ (°) |
|---|---|---|
| 8 ≤ P ≤ 11 | 0 ≤ $\Phi_1$ ≤ 15 | 75 ≤ $\Phi_2$ ≤ 90 |
| 11 ≤ P ≤ 13.5 | 0 ≤ $\Phi_1$ ≤ 15 | 75 ≤ $\Phi_2$ ≤ 90 |
| 13.5 ≤ P ≤ 16 | 0 ≤ $\Phi_1$ ≤ 20 | 70 ≤ $\Phi_2$ ≤ 90 |
| 16 ≤ P ≤ 18.5 | 5 ≤ $\Phi_1$ ≤ 25 | 65 ≤ $\Phi_2$ ≤ 90 |
| 18.5 ≤ P ≤ 60 | 10 ≤ $\Phi_1$ ≤ 30 | 60 ≤ $\Phi_2$ ≤ 90 |

When the stem electrode and the polarization axis of the second polarizer are coincided, the angles between the branch electrode in different zones and the stem electrode are respectively some combination of 0-30° and 60-90°. According to the value of the pitch P of different liquid crystal materials, different angles Φ are corresponding designed, so that the transmittance is maximized. During the process of the actual design of the first electrode 11, in order to simplify the process, the sum of the angle $\Phi_1$ and angle $\Phi_2$ can be maintained at 90°.

Each of the branch electrodes 112 has the same width, the gaps between adjacent branch electrodes 112 are the same. The stem electrode 111 and the branch electrode 112 are both elongated structures, and the materials are all indium tin oxide materials.

The first substrate 10 is a thin film transistor array substrate. The second substrate 20 is a color film substrate. The second substrate 20 may further be provided with a color filter layer for realizing color display, a black matrix for preventing light leakage, and a spacer for providing a box-thickness. The first substrate 10 and the second substrate 20 may be a glass substrate or a flexible substrate.

The first electrode 11 is a pixel electrode, the second electrode 21 is a common electrode. The first substrate 10 and the second substrate 20 are further provided with an alignment layer. The liquid crystal is injected between the two substrates. The injection method may be an inkjet printing method or the like. After the liquid crystal is injected to form the liquid crystal cell, the liquid crystal is treated by PSVA, that is, it is energized to be irradiated with ultraviolet light, to form a pretilt angle.

The beneficial effects: by adding a chiral agent to the liquid crystal, the liquid crystal molecules around the pixel are driven by a helical twisting force generated by the chiral agent to rotate, thereby reducing the dark area around the pixel, by additionally changing the angle between the stem electrode and the branch electrode or the angle between the polarization axis of the polarizer and the stem electrode, the transmittance of the liquid crystal display device is maximized, thereby achieving higher transmittance display.

In the above, the present disclosure has been disclosed as above in the preferred embodiments. However, the preferred embodiments should not be construed as limitations of the present disclosure. Those skilled in the art can make various modifications without departing from the spirit and scope of the present disclosure. Hence, the scope of the present disclosure should be subject to the scope defined in the claims.

What is claimed is:

1. A liquid crystal display device, comprising:
   a first substrate having a first electrode;
   a second substrate opposite to the first substrate and having a second electrode;
   a liquid crystal layer sandwiched between the first substrate and the second substrate;
   a first polarizer arranged on one side of the first substrate away from the liquid crystal layer; and
   a second polarizer arranged on one side of the second substrate away from the liquid crystal layer;
   wherein a chiral agent is added into liquid crystals filled in the liquid crystal layer, a pitch of the liquid crystals ranges from 8 to 60 µm an effective optical path difference of the liquid crystals ranges from 300 to 550 nm; a thickness of the liquid crystal layer ranges from 2.5 to 4 µm; the first electrode comprises at least one stem electrode and a plurality of branch electrodes, the stem electrode divides the plurality of branch electrodes into a first zone, a second zone adjacent to the first zone, a third zone diagonally opposite to the first zone, and a fourth zone diagonally opposite to the second zone, the branch electrodes in different zones extend from the stem electrode along different directions, and the branch electrodes in a same zone are arranged in parallel;
   wherein an angle between the branch electrode in the first zone and the stem electrode and an angle between the branch electrode in the third zone and the stem electrode are $\Phi_1$ and an angle between the branch electrode in the second zone and the stem electrode and an angle between the branch electrode in the fourth zone and the stem electrode are $\Phi_2$; and
   wherein $\Phi_1$ is equal to $\Phi_2$ and is 45 degrees, and an angle between a polarization axis of the second polarizer and the stem electrode is θ, when the pitch of the liquid crystals ranges from 8 to 11 µm, θ ranges from 40 to 60 degrees; when the pitch of the liquid crystals ranges from 11 to 13.5 µm, θ ranges from 35 to 55 degrees; when the pitch of the liquid crystals ranges from 13.5 to 16 µm, θ ranges from 25 to 45 degrees; when the pitch of the liquid crystals ranges from 16 to 18.5 µm, θ ranges from 20 to 40 degrees; and when the pitch of the liquid crystals ranges from 18.5 to 60 µm, θ ranges from 15 to 35 degrees; or
   wherein $\Phi_1$ is not equal to $\Phi_2$, and θ is zero, when the pitch of the liquid crystals ranges from 8 to 13.5 µm, $\Phi_1$ ranges from 0 to 15 degrees and $\Phi_2$ ranges from 75 to 90 degrees; when the pitch of the liquid crystals ranges from 13.5 to 16 µm, $\Phi_1$ ranges from 0 to 20 degrees and $\Phi_2$ ranges from 70 to 90 degrees; when the pitch of the liquid crystals ranges from 16 to 18.5 µm, $\Phi_1$ ranges from 5 to 25 degrees and $\Phi_2$ ranges from 65 to 90 degrees; and when the pitch of the liquid crystals ranges from 18.5 to 60 µm, $\Phi_1$ ranges from 10 to 30 degrees and $\Phi_2$ ranges from 60 to 90 degrees.

2. The liquid crystal display device as claimed in claim 1, wherein the pitch of the liquid crystal is 2-10 times the thickness of the liquid crystal layer.

3. A liquid crystal display device, comprising:
   a first substrate having a first electrode;
   a second substrate opposite to the first substrate and having a second electrode;
   a liquid crystal layer sandwiched between the first substrate and the second substrate;
   a first polarizer arranged on one side of the first substrate away from the liquid crystal layer; and
   a second polarizer arranged on one side of the second substrate away from the liquid crystal layer;
   wherein, a chiral agent is added into liquid crystals filled in the liquid crystal layer, a pitch of the liquid crystals ranges from 8 to 60 µm;
   the first electrode comprises at least one stem electrode and a plurality of branch electrodes, the stem electrode divides the plurality of branch electrodes into a first zone, a second zone adjacent to the first zone, a third zone diagonally opposite to the first zone, and a fourth zone diagonally opposite to the second zone, the branch electrodes in different zones extend from the stem electrode along different directions, and the branch electrodes in a same zone are arranged in parallel;
   wherein an angle between the branch electrode in the first zone and the stem electrode and an angle between the branch electrode in the third zone and the stem electrode are $\Phi_1$; and an angle between the branch electrode in the second zone and the stem electrode and an angle between the branch electrode in the fourth zone and the stem electrode are $\Phi_2$; and
   wherein $\Phi_1$ is equal to $\Phi_2$ and is 45 degrees, and an angle between a polarization axis of the second polarizer and the stem electrode is θ, when the pitch of the liquid crystals ranges from 8 to 11 µm, θ ranges from 40 to 60 degrees; when the pitch of the liquid crystals ranges from 11 to 13.5 µm, θ ranges from 35 to 55 degrees; when the pitch of the liquid crystals ranges from 13.5 to 16 µm, θ ranges from 25 to 45 degrees; when the pitch of the liquid crystals ranges from 16 to 18.5 µm, θ ranges from 20 to 40 degrees; and when the pitch of the liquid crystals ranges from 18.5 to 60 µm, θ ranges from 15 to 35 degrees; or
   wherein $\Phi_1$ is not equal to $\Phi_2$, and θ is zero, when the pitch of the liquid crystals ranges from 8 to 13.5 µm, $\Phi_1$ ranges from 0 to 15 degrees and $\Phi_2$ ranges from 75 to 90 degrees; when the pitch of the liquid crystals ranges from 13.5 to 16 µm, $\Phi_1$ ranges from 0 to 20 degrees and $\Phi_2$ ranges from 70 to 90 degrees; when the pitch of the liquid crystals ranges from 16 to 18.5 µm, $\Phi_1$ ranges from 5 to 25 degrees and $\Phi_2$ ranges from 65 to 90 degrees; and when the pitch of the liquid crystals ranges from 18.5 to 60 µm, $\Phi_1$ ranges from 10 to 30 degrees and $\Phi_2$ ranges from 60 to 90 degrees.

4. The liquid crystal display device as claimed in claim 3, wherein a thickness of the liquid crystal layer ranges from 2.5 to 4 µm.

5. The liquid crystal display device as claimed in claim 4, wherein the pitch of the liquid crystals is 2-10 times the thickness of the liquid crystal layer.

* * * * *